June 5, 1951 J. E. RAMSEY Re. 23,374

CIRCULAR REFRIGERATOR WITH PIVOTED ROTATABLE SHELVES

Original Filed Feb. 7, 1944 2 Sheets-Sheet 1

INVENTOR.
JAMES E. RAMSEY.
BY
Lester B. Clarke,
ATTORNEY.

June 5, 1951 J. E. RAMSEY Re. 23,374

CIRCULAR REFRIGERATOR WITH PIVOTED ROTATABLE SHELVES

Original Filed Feb. 7, 1944 2 Sheets-Sheet 2

INVENTOR.
JAMES E. RAMSEY.
BY
Lester B. Clark.
ATTORNEY.

Reissued June 5, 1951 Re. 23,374

UNITED STATES PATENT OFFICE 23,374

CIRCULAR REFRIGERATOR WITH PIVOTED ROTATABLE SHELVES

James E. Ramsey, St. Louis, Mo.

Original No. 2,457,919, dated January 4, 1949, Serial No. 521,294, February 7, 1944. Application for reissue December 29, 1949, Serial No. 135,671

4 Claims. (Cl. 62—89)

Matter enclosed in heavy brackets [ ] appears in the original patent but forms no part of this reissue specification; matter printed in italics indicates the additions made by reissue.

The invention relates to a refrigerator construction and has particularly in mind the economizing of space on the one hand while making every portion of the inside of the refrigerator readily accessible on the other hand.

With the conventional type of square or rectangular refrigerator the articles usually desired are positioned on the back side of the shelf and other articles must be removed in order to obtain them and very often a great deal of space is wasted on the rear portions of the shelves because it is readily inaccessible. With these difficulties in mind the present refrigerator has been devised wherein every portion of the shelves is readily accessible and the maximum of space is made available when the configuration of the refrigerator is considered.

It is one of the objects of the invention to provide a circular refrigerator having circular rotatable shelves which can be pivoted outwardly from the refrigerator to make all portions thereof accessible.

Another object of the invention is to provide a circular refrigerator with a pivoted rotatable shelf.

Another object of the invention is to support a plurality of rotatable shelves in a refrigerator from one side of the refrigerator housing so that the shelves may be independently or collectively pivoted outwardly in order to have access to every portion thereof.

Another object of the invention is to provide a circular refrigerator with an arcuate door so as to completely enclose circular shelf constructions.

Another object of the invention is to rotatably support a circular shelf in a refrigerator by means of an extended pivoted arm from the side in order to make the maximum space available for storage.

Another object of the invention is to provide a rotatable crisping container for refrigerators.

Still another object of the invention is to provide the combination of a freezing chamber having food freezing containers adjacent each side thereof and with sliding door constructions to close the food containers.

Figure 1:
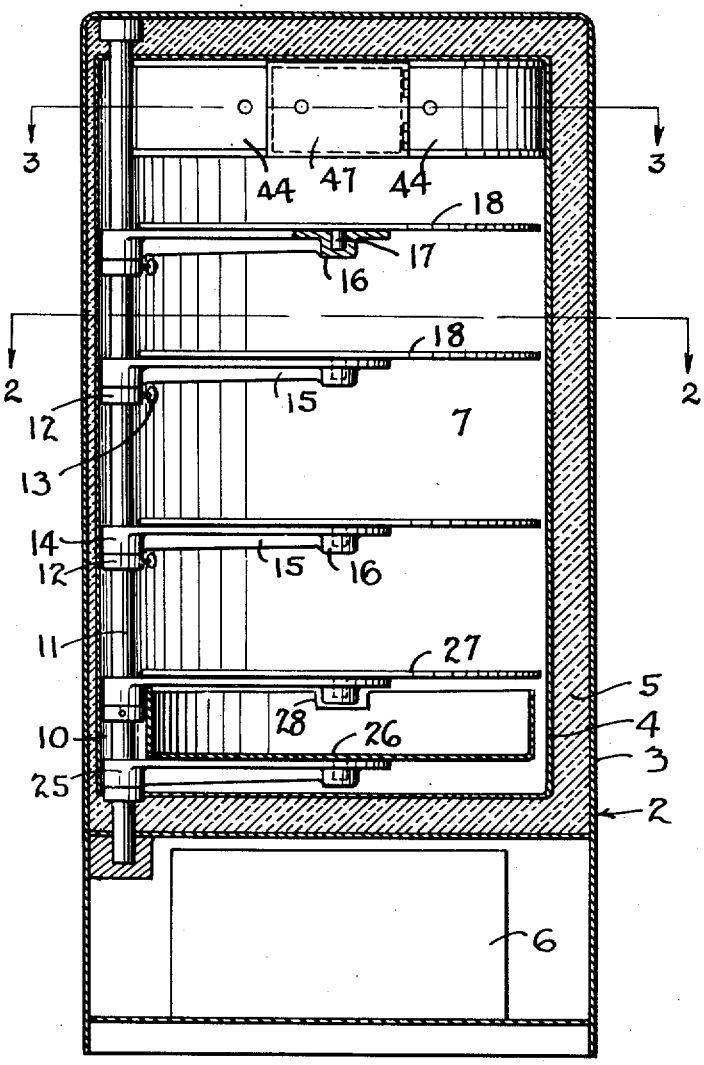

Other and further objects of the invention will be readily apparent when the following description is considered in connection with the accompanying drawings wherein:

Fig. 1 is a vertical sectional view through a refrigerator constructed in accordance with the invention and illustrating the arrangement of the parts.

Figure 2:
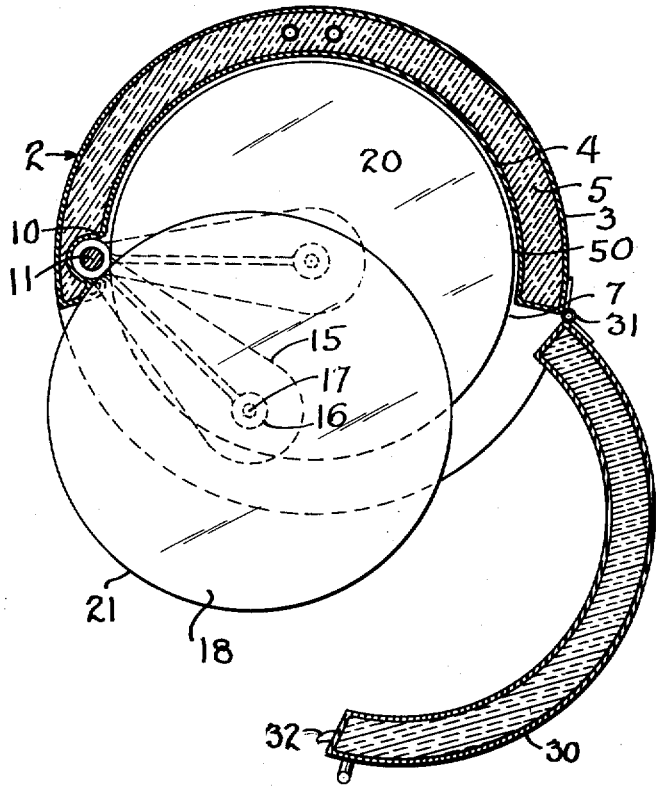
Figure 3:
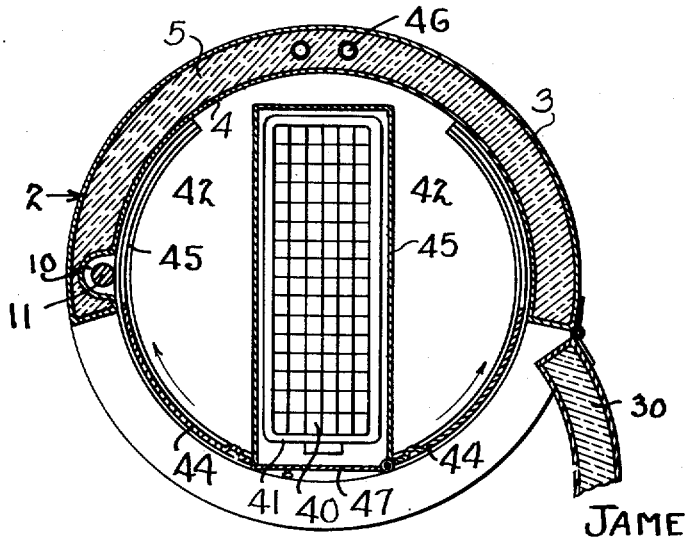

Figs. 2 and 3 are sections taken on the lines 2—2 and 3—3 respectively of Fig. 1 and illustrating the arrangement of the various parts of the refrigerator.

In Fig. 1 the refrigerator 2 may be of any heighth or diameter, but is preferably in the form of a circular housing having the outer sheath 3 of metal and the inner liner 4 between which the insulating material 5 will be confined. The power and compression equipment can be contained in the base 6 of the housing while the storage compartment 7 occupies the larger portion of the inside of the housing.

As seen in Fig. 2 the inside of the housing is arranged with a recess or depression 10 and a support column or shaft 11 is suitably mounted in this recess in a vertical position as clearly seen in Fig. 1. This shaft or rod may have a plurality of adjustable collars 12 thereon which can be set or released by the thumb screws 13. Each one of these collars serves as a support for the hub 14 of an arm 15 so that such arm may pivot or turn in a horizontal plane about the shaft 11. Each [one] of these arms has a support bearing 16 at its end which is arranged to receive the stub shaft 17 formed on a circular shelf 18. In this manner the shelf can be moved into the position inside of the refrigerator as indicated by the shelf 20, in Fig. 2, or by pivoting the arm 15 the shelf may be moved outwardly to the position of the shelf 21 in Fig. 2. It seems obvious that by turning of the shelf 18 access may be had to every portion thereof so as to bring vacant space to the front to deposit articles thereon or to withdraw an article which is at the back of the shelf by turning the shelf in order to readily reach such article.

Any desired number of these arms 15 may be provided and it seems obvious that the collars 12 can be adjusted to obtain the desired space between them for articles having different heights.

The lowermost arm 25 may support a crisping container 26 which is in the form of a circular pan which will be substantially closed by the shelf 27 directly above it when the crisper and the shelf are both in normal position and the refrigerator closed. When access is desired the crisper may be tilted outwardly to the position of the shelf 21 in Fig. 2, the top will be uncovered because the crisper moves out from underneath the shelf 27. One or more suitable recesses 28 can be formed in the upper edge of the crisper to permit it to pass the bearing portion 16 on the arm above it.

The refrigerator door 30 is best seen in open position in Fig. 2 and is made up of a section or segment of the circular housing which is in the form of an arcuate portion hinged at 31 and carrying a latch 32. When the door closes it will completely confine the shelves and when it is open it will permit pivoting of the shelves to the position of Fig. 2.

Fig. 3 shows the freezing section 40 in which any number of ice cube trays 41 may be deposited. This section is shown as rectangular in plan view, having side walls 43 and being disposed centrally of the refrigerator relative to the door so that it leaves a segmental area 42 at each side thereof which can be used for freezing foods and may be designated as a food freezing chamber or container. In order to obtain a minimum temperature in these chambers an arcuate sliding door or closure 44 is arranged to be moved to the position of Fig. 3 to close these chambers. Such closures are movable in the guide tracks 45 extending around inside of the refrigerator. The circulation pipes 46 extending to the freezing unit from the mechanism in the base are shown as passing upwardly in the insulating material. A door 47 may be used to close the freezing section.

It will be noted that there is sufficient clearance as at 50 between the shelves and the interior lining 4 of the refrigerator to permit circulation of the air to all parts of the inside 7 of the refrigerator.

What is claimed is:

[1. A refrigerator including a circular housing having a door portion hinged to swing outwardly and curved to conform to the housing, an upstanding support member disposed substantially upon the circular inside wall of the housing, a plurality of swingable arms vertically adjustable up and down on said support, and rotatable shelves on said arms whereby access may be had to every portion of each shelf.]

2. A circular refrigerator, circular shelves therein, a pivoted arm supporting each shelf, said arms being pivoted adjacent the wall to swing out of the refrigerator, and freezing and ice compartments above said shelves, said freezing compartment having an arcuate sliding closure.

[3. In a refrigerator a vertical support rod having its axis substantially upon the inner wall of the refrigerator cabinet, a collar adjustable along said rod, an arm pivoted on the rod and supported by said collar, and a shelf rotatably mounted on said arm whereby all the area of said shelf may be made accessible by pivoting said arm and rotating the shelf.]

4. In a circular refrigerator a rectangular ice unit, a food freezing compartment at each side thereof formed by upper and lower walls, the arcuate inner shell of the refrigerator compartment and the side walls of said ice unit, and a curved sliding closure for each of said compartments.

5. In a circular refrigerator having a circular interior, a rectangular ice unit having the forward edges of the sides thereof lying substantially upon the cylindrical surface defined by the interior wall of the refrigerator, a food freezing compartment [of] extending sidewardly from at least one of such edges, said compartment having its outer wall formed by the curved inner wall of the refrigerator compartment and a curved sliding door for said compartment.

*6. A refrigerator including a housing, freezing and ice compartments therein, arcuate sliding closures for said freezing compartments, a vertical support rod in said housing, support means on said rod to position shelves longitudinally of the housing, means cooperating with said support means to retain said support means in predetermined elevations on said rod, said shelves being of a shape to fit into said housing, a shelf pivot on the end of each support means remote from said rod so that each shelf may be rotated relative to said support means whereby all the area of said shelf may be made accessible by turning said shelf on said pivot in a horizontal plane, each said support means in turn being pivoted to swing in a horizontal plane relative to said rod and into and out of said housing, a door hinged to said housing and swingable to enclose said shelves when they are in said housing.*

JAMES E. RAMSEY.

REFERENCES CITED

The following references are of record in the file of this patent or the original patent:

UNITED STATES PATENTS

| Number | Name | Date |
|---|---|---|
| 307,963 | Kotzum | Nov. 11, 1884 |
| 397,984 | Hess | Feb. 19, 1889 |
| 589,463 | Case | Sept. 7, 1897 |
| 640,580 | Miller | Jan. 2, 1900 |
| 988,269 | Joyce | Mar. 28, 1911 |
| 1,070,118 | Cornyn | Aug. 12, 1913 |
| 1,291,366 | Banks | Jan. 14, 1919 |
| 1,396,548 | Bartlett | Nov. 8, 1921 |
| 2,092,430 | Stratton | Sept. 7, 1937 |
| 2,095,655 | Vlcek | Oct. 12, 1937 |
| 2,115,343 | Scurlock | Apr. 26, 1938 |
| 2,139,184 | Burns | Dec. 6, 1938 |
| 2,139,441 | Clark | Dec. 6, 1938 |
| 2,142,008 | Scott | Dec. 27, 1938 |
| 2,161,050 | Hovey | June 6, 1939 |

FOREIGN PATENTS

| Number | Country | Date |
|---|---|---|
| 306,042 | Germany | June 14, 1918 |